(No Model.) 2 Sheets—Sheet 1.
G. RICHARDSON & G. ENDERSON.
ORCHARD CULTIVATOR.
No. 279,277. Patented June 12, 1883.
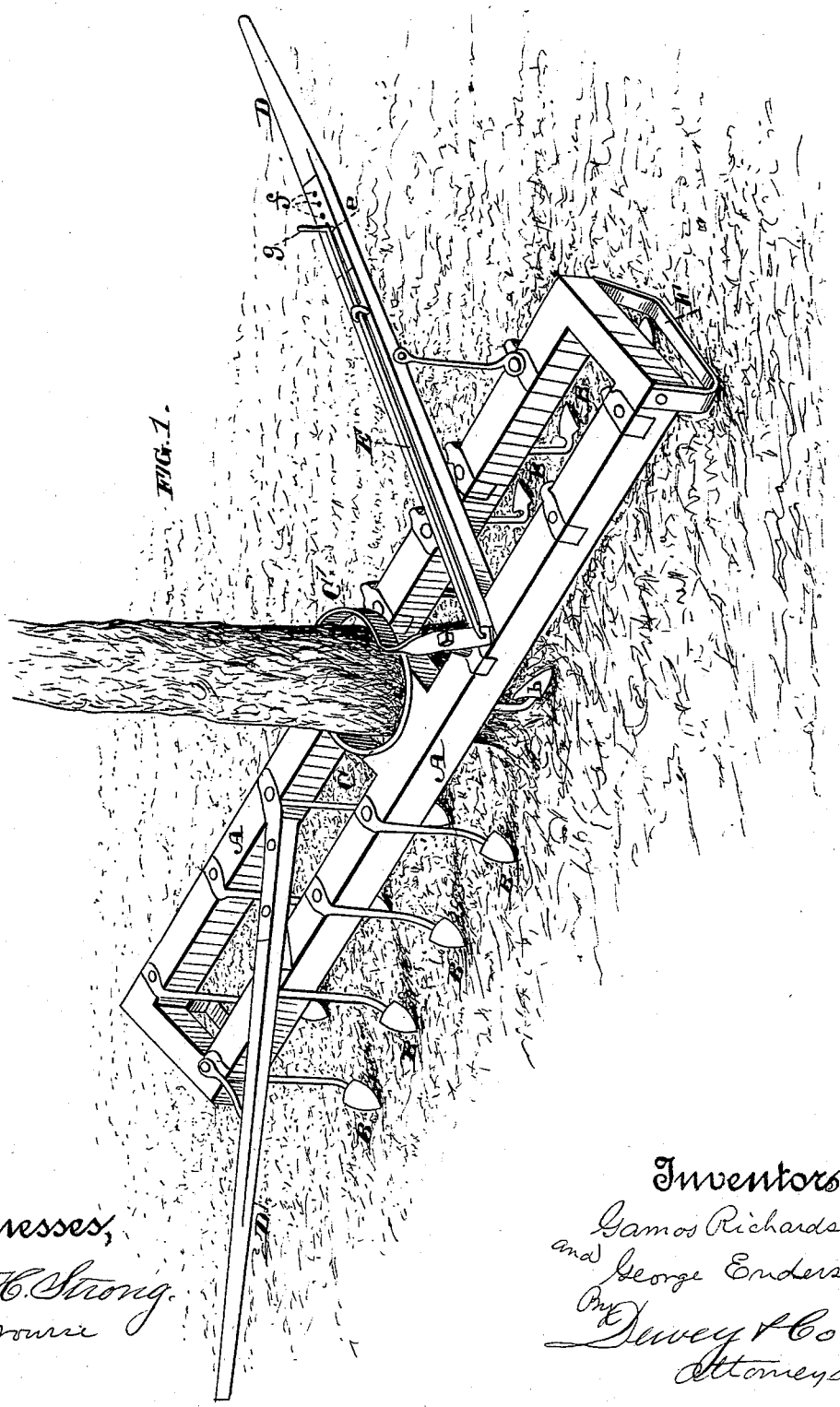
Witnesses,
Geo. H. Strong.
Inventors,
James Richardson
and George Enderson
By Dewey & Co,
Attorneys

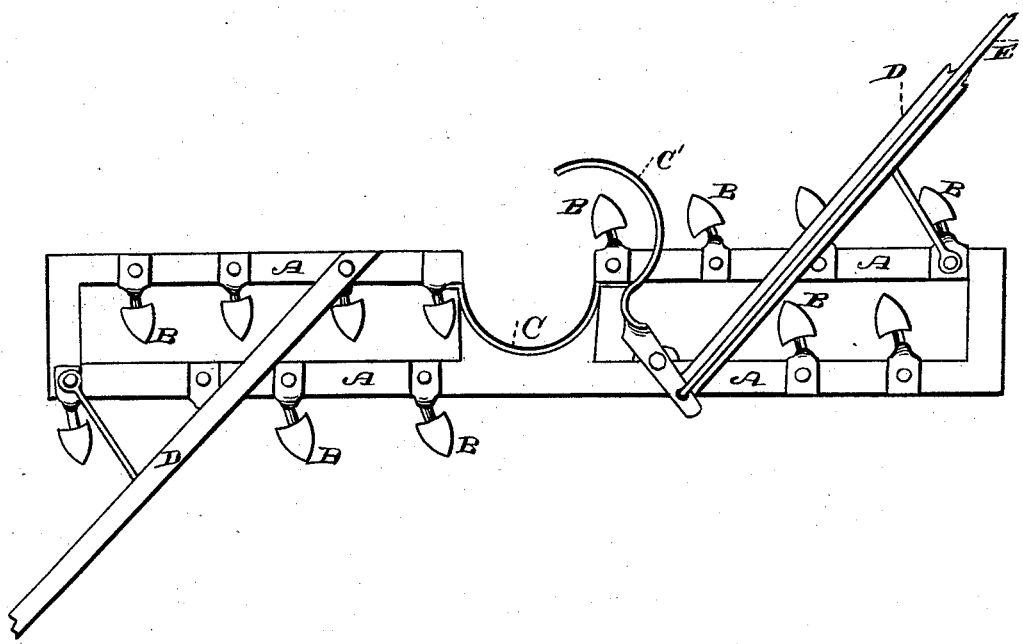

UNITED STATES PATENT OFFICE.

GAMOS RICHARDSON AND GEORGE ENDERSON, OF SAN JOSÉ, CALIFORNIA.

ORCHARD-CULTIVATOR.

SPECIFICATION forming part of Letters Patent No. 279,277, dated June 12, 1883.

Application filed February 27, 1883. (No model.)

*To all whom it may concern:*

Be it known that we, GAMOS RICHARDSON and GEORGE ENDERSON, of San José, county of Santa Clara, State of California, have invented an Improved Orchard-Cultivator; and we hereby declare the following to be a full, clear, and exact description thereof.

Our invention relates to a new and useful cultivator, specially designed for use around trees in orchards, &c.

Our invention consists in a frame the teeth of which on one side of the center are set in an opposite direction to those upon the other side. The center of the frame is provided with a bearing for embracing the trunk of the tree and a means for rendering it adjustable to fit different sizes of trees, all of which will hereinafter fully appear, reference being made to the accompanying drawings, in which—

Figure 1, Sheet 1, is a perspective view of our device, showing its application to the trunk of a tree. Fig. 2, Sheet 2, is a plan of our cultivator.

In order to obtain good results from fruit-trees, it is necessary to keep the ground around them well broken up and light. The use of the ordinary plows and cultivators for this purpose requires careful handling and some skill to get in as close to the trees as possible without injuring them. This is especially the case where the trees are permitted to head low, as is now mostly done.

It is the object of our invention to cultivate around the tree as close as is necessary, and without damage and with facility.

Our device consists of a long light frame, A, having any form of cultivator-teeth B secured thereto. Upon one side of the center of the frame the teeth are all turned in a direction opposite to the direction of those upon the other side of the center, Fig. 2. A tooth, b, Fig. 1, is situated near the center in order to get as near the trunk as possible. One side of the frame is cut out at its middle, and has let into it a bar, forming a semicircular bearing, C.

D D are the draft-bars, secured to opposite sides of the frame, and extending diagonally in opposite directions, and parallel.

C' is a curved bar, pivoted by one end upon the frame. With this is connected a rod, E, extending in suitable guides along one of the draft-bars, and having a detent, e, upon its end, adapted to engage with any of a series of holes, f, formed in a plate secured upon said bar. An upright piece, g, upon the end of this rod serves as a handle by which to grasp it. F is a runner on each end of frame A, to limit the depth of the teeth.

The operation of this cultivator is as follows: It is fitted to the trunk of a tree, its bearing C encircling one side of the trunk, Fig. 1. The rod E is then pulled outward, which swings the curved bar C', to encircle the other side of the trunk, or enough of it to secure the frame to the tree, Fig. 1. The rod is held in place by the detent e, and thus insures the bearing of the frame upon the trunk. The draft is then applied to the bars D, and the cultivator travels around the tree, using its trunk as a pivot.

It will be observed that when the device has moved through one hundred and eighty degrees the ground will have been broken throughout the entire circle, for at that point the teeth on one side will reach the place where the teeth on the other side commenced. Then by making one complete turn of the cultivator the ground will be worked over twice, and will thus be fully broken or pulverized and put in proper order.

We intend to use this as a hand-cultivator, because it will be easier for men to move around the tree without injuring it than for horses, and the device, being light, may readily be operated by hand. It may be used under low-headed trees without damaging them, and on account of the swinging bar C' it may be adjusted to various sizes of trunks. The bearing by which it encircles the tree being smooth and not fitted very tightly, no injury to the bark will result.

Having thus described our invention, what we wish to secure by Letters Patent is—

1. An orchard-cultivator having teeth arranged in opposite directions upon each side of the center, and provided with a central bearing adapted to fit and turn upon the trunk of the tree, as described.

2. An orchard-cultivator consisting of a frame, A, having a central bearing, C, adapted to fit one side of the trunk of a tree, the teeth B, arranged in opposite directions upon each side of the center of the frame, and an adjustable bearing attached to the frame and adapted to fit the other side of the trunk of the tree, substantially as and for the purpose herein described.

3. An orchard-cultivator consisting of the frame A, having a central curved bearing, C, the teeth B on each side of the center of the frame, the oppositely-extending parallel draft-bars D D, the curved bar C', pivoted on the frame, and means for adjusting and holding said bar to its place, consisting of the rod E, secured to said bar, and engaging with a suitable holding-rack on the draft-bar D, and the runners F, all arranged and operating substantially as and for the purpose herein described.

In witness whereof we hereunto set our hands.

GAMOS RICHARDSON.
GEORGE ENDERSON.

Witnesses:
GEO. McCRACKEN,
JAMES B. CAPP.